US008285895B2

United States Patent
Schramm et al.

(10) Patent No.: US 8,285,895 B2
(45) Date of Patent: Oct. 9, 2012

(54) HANDSHAKE FREE SHARING IN A COMPUTER ARCHITECTURE

(75) Inventors: Michal Schramm, Tel-Aviv (IL); Nir Tasher, Tel Mond (IL)

(73) Assignee: Winbond Electronics Corporation, Hsin Chu (TW)

( * ) Notice: Subject to any disclaimer, the term of this patent is extended or adjusted under 35 U.S.C. 154(b) by 459 days.

(21) Appl. No.: 11/834,053

(22) Filed: Aug. 6, 2007

(65) Prior Publication Data
US 2009/0043916 A1 Feb. 12, 2009

(51) Int. Cl.
G06F 3/00 (2006.01)
(52) U.S. Cl. ............................................. 710/48; 710/11
(58) Field of Classification Search .................... 710/48, 710/11
See application file for complete search history.

(56) References Cited

U.S. PATENT DOCUMENTS

| | | | |
|---|---|---|---|
| 5,603,055 A | 2/1997 | Evoy et al. | |
| 5,794,054 A | 8/1998 | Le et al. | |
| 5,819,087 A | 10/1998 | Le et al. | |
| 5,822,779 A | 10/1998 | Intrater et al. | |
| 5,892,943 A | 4/1999 | Rockford et al. | |
| 5,999,476 A | 12/1999 | Dutton et al. | |
| 6,154,838 A | 11/2000 | Le et al. | |
| 6,272,584 B1 | 8/2001 | Stancil | |
| 6,976,136 B2 | 12/2005 | Falik et al. | |
| 7,089,339 B2 | 8/2006 | Falik et al. | |
| 2006/0155907 A1* | 7/2006 | Yoshida et al. | 710/260 |
| 2007/0067684 A1* | 3/2007 | Stolero et al. | 714/718 |
| 2007/0208902 A1* | 9/2007 | Park et al. | 711/100 |
| 2008/0028408 A1* | 1/2008 | Day et al. | 718/104 |
| 2008/0062927 A1* | 3/2008 | Zhu et al. | 370/331 |

FOREIGN PATENT DOCUMENTS

| | | |
|---|---|---|
| CN | 101000596 | 7/2007 |
| JP | 60-237566 | 11/1985 |
| JP | 61/059516 | 3/1986 |
| JP | 03-116335 | 5/1991 |
| JP | 2003-196251 | 7/2003 |
| WO | WO02/093343 | 11/2002 |

OTHER PUBLICATIONS

"Intel® I/O Controller Hub 7 (ICH7) Family"; Datasheet: For the Intel® 82801GB ICH7, 82801GR ICH7R, 82801GDH ICH7DH, 82801GBM ICH7-M, 82801GHM ICH7-M DH, and 82801GU ICH-7-U I/O Controller Hubs, Apr. 2007, 824 pages, Document No. 307013-003.

"PC87591E, PC87591S and PC87591L LPC Mobile Embedded Controllers"; Preliminary, Mar. 2004, Revision 1.07; © 2004 National Semiconductor Corporation, 437 pages.

* cited by examiner

Primary Examiner — Henry Tsai
Assistant Examiner — John Roche
(74) Attorney, Agent, or Firm — D. Kliger I.P. Services Ltd.

(57) ABSTRACT

A system arrangement including a memory unit having a memory interface in accordance with a handshake-free protocol between the memory and an accessing master, a bus connected to the memory unit and first and second masters. The first master operative to access the memory unit through the bus and the memory interface and operative to perform interrupts following reception of an interrupt request through an interrupt interface. The second master operative to access the memory unit through the bus and memory interface. The second master being configured to transfer an interrupt request to the first processor before accessing the memory unit.

31 Claims, 3 Drawing Sheets

HANDSHAKE FREE SHARING IN A COMPUTER ARCHITECTURE

FIELD OF THE INVENTION

The present invention relates generally to computer architectures and specifically, but not exclusively, to memory access architectures.

BACKGROUND

Processors are used for a very wide range of tasks, including, inter alia, mathematical calculations, database management, communications and the controlling of devices. In many cases, processors require a separate memory unit, for performing functions such as the storage of processing results or intermediate values, and/or from which to retrieve operation software and/or input data. A processor which controls the access to the memory is referred to as a "master". The term master is also used to represent other units, not necessarily processors, which control access to a memory.

A variety of communication protocols have been defined for internal communication purposes, including data transfer between the processor and the memory unit. Some protocols were defined particularly for use in multi-processor configurations, wherein a plurality of processors can access a shared memory unit, such as through a bus, for example. Protocols for multiple processor applications sharing a common memory or other resource have rules governing which processor is allowed to access the memory unit and when. Such protocols generally define hand-shake methods, which are used to notify the processor when there is a problem in its communication with the memory unit. The main disadvantage of handshake protocols is their complexity, as in some applications, a simpler protocol is sufficient.

The Serial Peripheral Interface, henceforth SPI, is a simple synchronous data link protocol. SPI is designed for accessing one or more memory units by only a single master. Hence, SPI has no low layer provisions, such as hand-shake provisions, for verifying that instructions given were indeed performed. It also lacks error detection and correction provisions. Nevertheless, due to its simplicity, SPI enjoys the advantages of fast operation using a small number of communication lines. Consequently, SPI is a popular protocol for memory units associated with a single processor.

When, however, two processors require external memory units, each processor is required to have its own memory unit, regardless of how much memory space it requires and how often it accesses the memory unit.

One method of avoiding the necessity for separate memory units, is to have a first processor send access requests to a shared memory unit in a Low Pin Count (LPC) format that supports a bus-busy indication. In such a configuration, requests from the first processor are forwarded to the second processor which translates them into the SPI format and transfers them to the memory unit. It will be appreciated that this method requires the first processor supporting the LPC format and the second processor being configured to perform the format translation.

Another method of sharing a memory unit between processors is to perform a hardware handshake between two processors sharing the memory. This requires that the processors support the handshake protocol, and is complex when more than two processors are involved.

U.S. Pat. No. 5,603,055 to Evoy et al., dated Feb. 11, 1997, the disclosure of which is incorporated herein by reference, describes a method of sharing a ROM memory between a keyboard controller (i.e., processor) and a system processor. At initial boot-up, the system processor accesses the shared ROM to retrieve the system BIOS, and afterwards, the shared ROM is used by the keyboard controller. This method is unsuitable for applications wherein intermittent access to the memory is required by both processors.

U.S. Pat. No. 5,892,943 to Rockford, Dunnihoo and Wahler titled "Shared bios ROM warm boot", the disclosure of which is incorporated herein by reference, describes the sharing of a memory unit between a host processor, which uses the memory unit for uploading the BIOS, and a keyboard controller. A logic circuitry connecting the host processor and the keyboard controller to the memory unit only allows the host processor to access the memory when the keyboard controller is disabled, such as when the computer is first turned on. When the host attempts to access the memory at a different time, the logic circuitry emulates a set of op-codes to the processor, causing it to access a copy of the BIOS located in the main memory of the host. While this may solve the problem of accessing the BIOS, it does not allow intermittent access to the memory unit. Furthermore, this solution requires a memory with a parallel access interface and is not suitable for a serial interface.

Other solutions with similar disadvantages are described in U.S. Pat. No. 5,999,476 to Dutton et al., in U.S. Pat. No. 5,794,054, to Le et al., patented Aug. 11, 1998, and in U.S. Pat. No. 6,154,838 to Le et al., patented Nov. 28, 2000, the disclosures of which are incorporated herein by reference.

SUMMARY OF THE INVENTION

An aspect of some embodiments of the present invention relates to an architecture in which a plurality of processors are connected to a single memory unit. A first processor is generally connected to the memory unit in a steady state. When a second processor is to access the memory unit, the second processor passes an interrupt request to the first processor and takes control of the memory unit on acknowledgement of the interrupt request. When the second processor completes its memory access it releases the first processor from the interrupt. During the interrupt, the first processor need not perform any useful tasks, but may instead simply be kept idle. The advantages from allowing multi-processor access to a single memory unit was determined to outweigh, in accordance with some embodiments of the invention, the disadvantage of having the first processor idle whenever the second processor accesses the memory unit.

Optionally, the memory unit operates using a single master protocol, such as SPI or Microwire. Preferably, the memory unit operates according to a handshake-free protocol. The protocol governing the operation of the memory unit need not support error detection or error correction. In some embodiments of the invention, the access to the memory unit requires fewer than 10 or even fewer than 5 pins. Optionally, the memory unit comprises a serial access memory unit.

In some embodiments of the invention, the first processor, which is generally connected to the memory, is a main processor of the architecture, which is directed at achieving a goal of the architecture, while the second processor is used for supportive tasks. The main processor thus optionally has control of the access to the memory. Optionally, the first processor has substantially more processing power than the second processor, optionally at least five times or even at least ten times the processing power of the second processor. In some embodiments of the invention, the first processor has a substantially higher instruction throughput than the second processor, for example at least five or even at least ten times greater. The first processor optionally has in these embodiments a transistor count substantially greater than the second processor, for example at least ten times or even at least twenty times greater.

In an exemplary embodiment of the invention, the first processor comprises a host processor and the second processor comprises an embedded controller. For example, the embedded controller may control one or more of a battery, keyboard, mouse and power supply unit of a computer.

In some embodiments of the invention, the memory unit stores executable code for the first and/or second processor which they execute to perform their task. For example, for the first processor, the memory unit may store code of the Basic Input/Output Services (BIOS), an Extensible Firmware Interface (EFI) or of system management code. Optionally, the memory unit stores code segments of a plurality of different applications for the first processor. In some embodiments of the invention, the memory unit stores large amounts of code for the first and/or second processors which the processor cannot hold in its internal memory and the processor performs paging with the code stored in the memory unit.

In some specific embodiments of the invention, the second processor is positioned along a bus connecting the first processor to the memory unit. Whilst not itself requiring access to the memory unit, the second processor operates as a pass-through unit which mirrors signals exchanged between the memory unit and the first processor.

There is therefore provided in accordance with an exemplary embodiment of the invention, a processor arrangement, comprising a memory unit having a memory interface in accordance with a handshake-free protocol between the memory and an accessing processor, a bus connected to the memory unit, a first processor operative to access the memory unit through the bus and the memory interface and operative to perform interrupts following reception of an interrupt request through an interrupt interface; and a second processor, or other master, operative to access the memory unit through the bus and memory interface; the second processor being configured to transfer an interrupt request to the first processor before accessing the memory unit.

Optionally, the memory interface comprises an interface in accordance with a protocol that does not support identification of collisions on the bus and/or does not support selection of a single processor to access the memory unit. Alternatively or additionally, the memory interface comprises an interface in accordance with the Serial Peripheral Interface SPI protocol.

Optionally, the first processor comprises a host of a computer. Optionally, the first processor is adapted to perform at least one of accessing the memory unit and receiving interrupt requests, through a host controller. Optionally, the second processor comprises an embedded controller of the computer. Optionally, the second processor comprises a controller of a computer. Optionally, the second processor comprises an embedded controller of a laptop computer. Alternatively or additionally, the second processor comprises a system controller of a computer. Further alternatively or additionally, the second processor comprises a keyboard controller. Optionally, the first processor has at least five times the processing power of the second processor. Optionally, the second processor is located along the bus connecting the first processor to the memory unit. Optionally, the second processor is configured to access the memory unit only after an acknowledgement is received from the first processor in response to the interrupt request. Optionally, the second processor is configured to transfer an interrupt request to the first processor before each access to the memory unit.

Optionally, the second master is configured to access the memory unit a predetermined time after transferring the interrupt request, regardless of whether an acknowledgement is received. Optionally, the first master is configured to refrain from accessing the memory unit through the bus, responsive to the interrupt request. Alternatively, the first master is configured to stop refraining from accessing the memory unit only in response to an indication from the second master. In some embodiments of the invention, the first master is configured to stop refraining from accessing the memory unit without receiving an indication from the second master.

There is further provided in accordance with an exemplary embodiment of the invention, a processor comprising a memory interface operative to control a memory unit via a handshake-free protocol, an interrupt interface for transfer of interrupt requests to processors; and a processing unit operative to perform processing tasks and to read data from a memory unit or to store data to the memory unit through the memory interface, the processing unit being configured to transfer an interrupt request through the interrupt interface and receive an acknowledgement of the interrupt request before accessing a memory through the memory interface.

Optionally, the processing unit is operative to receive the acknowledgement of the interrupt request via the interrupt interface or via a register independent of the interrupt interface. Optionally, the processing unit is operative to read code segments from the memory unit. Optionally, the processor includes an internal memory configured to store less than an entire code of an application to be performed by the processing unit, wherein the internal memory is configured to swap code segments from the memory unit through the memory interface. Optionally, the processing unit is operative to operate in a first state in which it does not transfer an interrupt request before accessing a memory through the memory interface and also to operate in a second state in which the processing unit only accesses the memory after transferring an interrupt receiving an acknowledgement of the interrupt. Optionally, the processing unit is operative to operate in the first state when there is no danger that another processor will access the memory.

There is further provided in accordance with an exemplary embodiment of the invention, a method of accessing a memory unit comprising the steps of: (i) providing one or more first processors connected to a memory unit, (ii) sending an interrupt request from a second processor to the one or more first processors, (iii) receiving an acknowledgement from the one or more first processors responsive to the interrupt request and (iv) accessing the memory unit while the one or more first processors are handling the interrupt request.

Optionally, the method includes releasing the one or more first processors from the interrupt request after completing the memory access. Optionally, accessing the memory unit comprises a read-only access. Alternatively, accessing the memory unit comprises a write access. Optionally, accessing the memory unit comprises accessing through an interface governed by a single master protocol.

BRIEF DESCRIPTION OF THE FIGURES

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Overview

Figure 1:
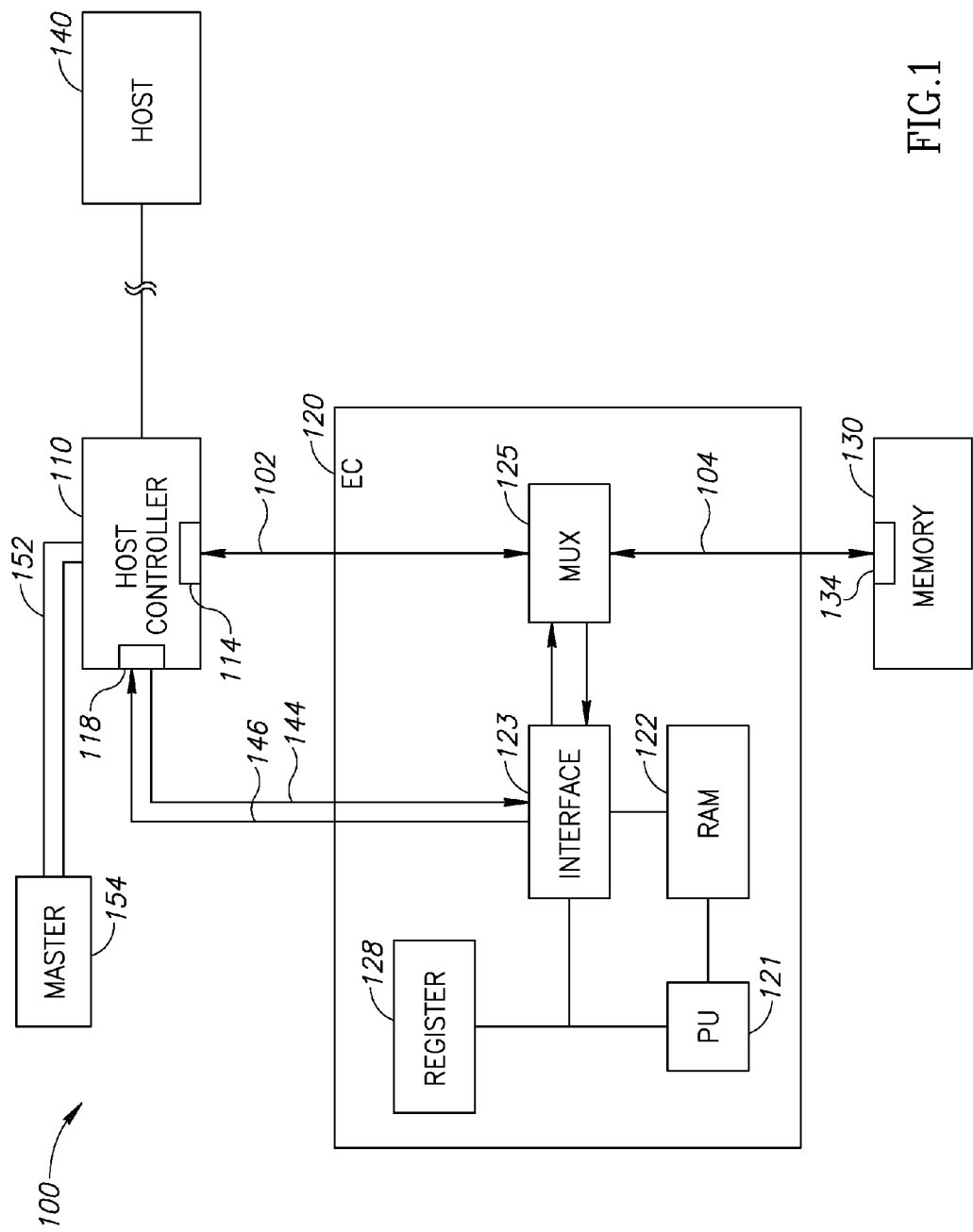
FIG. 1 is a schematic illustration of memory connections of a memory unit servicing a plurality of processors, in accordance with an exemplary embodiment of the present invention.

FIG. 1 is a schematic illustration of memory connections of a memory unit 130 servicing a plurality of processors of a computer 100 wherein for simplicity, only portions relevant to explaining an exemplary embodiment of the present invention are shown. Memory unit 130 is designed with an SPI interface 134, such that memory accesses to memory unit 130 are in accordance with the SPI protocol. Memory unit 130 may include substantially any suitable type of memory, such as a flash memory, a ROM and/or other non-volatile memory. Memory unit 130 may be of substantially any capacity, for example at least 1 Mbyte, 4 Mbyte or even at least 16 Mbyte. Memory unit 130 may be a read only memory or a read/write memory.

A host controller 110 (also known as a Southbridge and/or an I/O controller hub) is connected, via an SPI interface 114 thereof, to memory unit 130 through an SPI bus formed of a first segment 102 and a second segment 104. In some embodiments of the invention, host controller 110 does not have other memory interfaces beyond SPI interface 114. Alternatively, host controller 110 has other memory interfaces not used for accessing memory unit 130 in the configuration of the embodiment illustrated in FIG. 1. Optionally, host controller 110 accesses memory unit 130 to retrieve therefrom software code of one or more applications, such as the BIOS, LAN and/or system management of computer 100, for example. The retrieved information optionally includes portions of the software code, which are replaced as necessary, using code swapping (paging) methods. Alternatively or additionally, host controller 110 accesses memory unit 130 in order to store updates of the software code stored in memory unit 130, for example BIOS updates received by computer 100 over the Internet. Further alternatively or additionally, host controller 110 accesses memory unit 130 in order to store changes in the system configuration of computer 100.

An embedded controller (EC) 120 is optionally located along the SPI bus, between first segment 102 and second segment 104. When not accessing memory unit 130, embedded controller 120 optionally operates in a pass-through mode, in which controller 120 transparently transfers signals between bus segments 102 and 104 at suitable rates.

In some embodiments of the invention, embedded controller 120 controls one or more peripherals of computer 100, such as a keyboard, a mouse, a screen, a power supply and/or a battery (not shown). Computer 100 may be any of a wide variety of computers, such as a laptop computer, a desktop computer, a server computer, a point of sale computer or a thin client computer, for example. Embedded controller 120 optionally executes a software application it retrieves from memory unit 130. Embedded controller 120 optionally has a small internal memory, e.g., a random access memory (RAM) 122, into which it loads portions of the software application that it currently needs to execute. Occasionally, embedded controller 120 needs to swap one or more portions of the software application code by retrieving a different code portion from memory unit 130. Alternatively or additionally, embedded controller 120 executes software code directly stored within memory unit 130 and/or accesses memory unit 130 for other reasons, for example to store configuration parameters of the system.

Embedded controller 120 optionally includes a processing unit (PU) 121 which executes code in RAM 122 retrieved from memory unit 130. The code is retrieved through a memory interface 123, which connects to bus segment 104, through a multiplexer 125. Optionally, PU 121 is also connected directly to interface 123, so that PU 121 can receive data directly from memory 130, without the data passing through RAM 122.

Operation Flowchart

Figure 2:
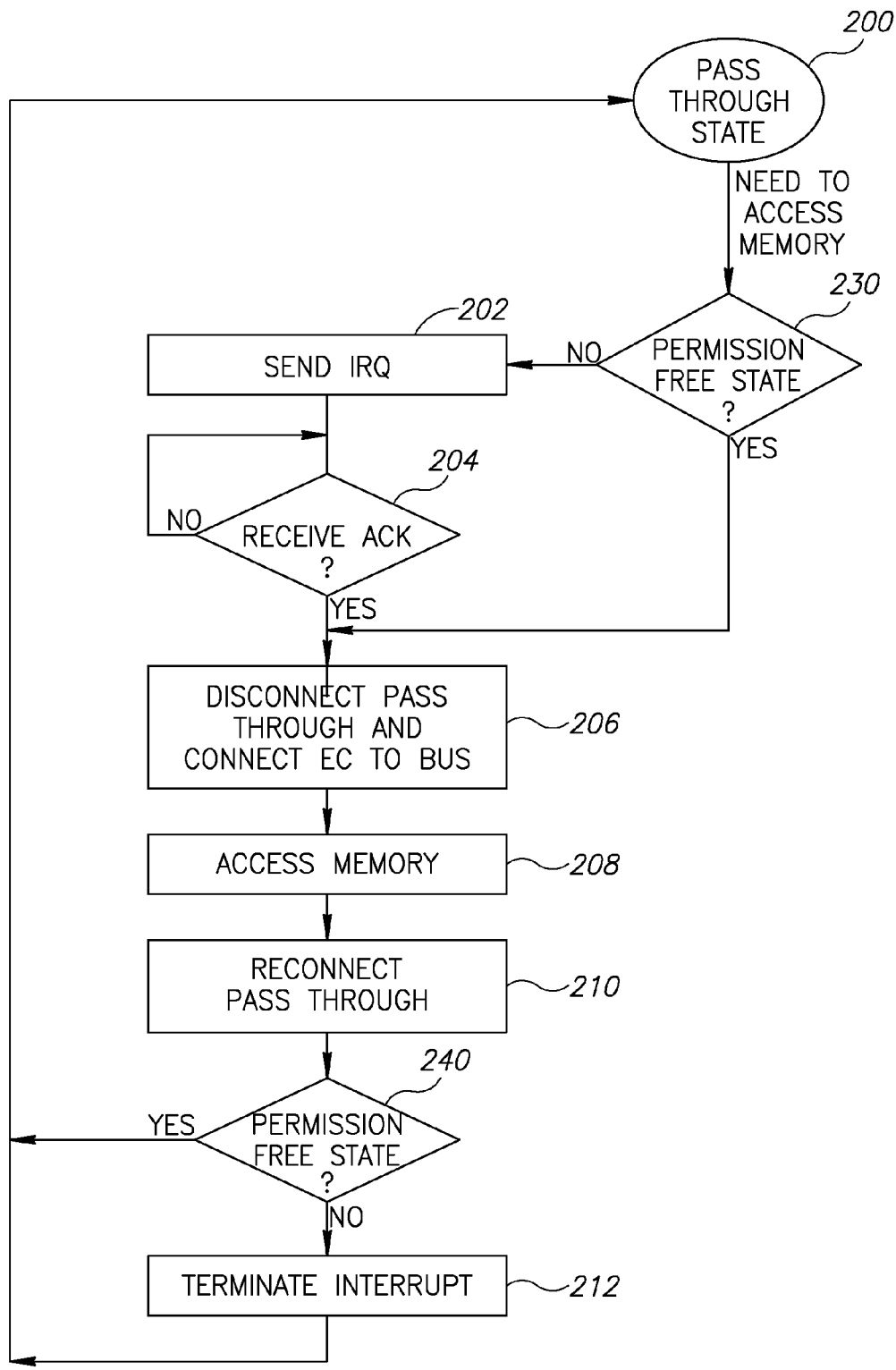
FIG. 2 is a flowchart of acts performed by an embedded controller in accessing a memory unit, in accordance with an exemplary embodiment of the present invention.

FIG. 2 is a flowchart of acts performed by embedded controller 120 in accessing memory unit 130, in accordance with an exemplary embodiment of the present invention. Thus still referring to FIG. 1, but additionally referring to FIG. 2, before taking any action, embedded unit 120 operates (200) as a pass-through unit which simply transfers signals between bus segments 102 and 104 substantially without delay, e.g., with a delay on the order of nano-seconds. When embedded controller 120 needs to read or write information to memory unit 130, it optionally checks (230) whether it is in a permission-free state in which it may access memory unit 130 without any preparations. If not (230) in the permission-free state, embedded controller 120 sends (202) an interrupt request (IRQ) to host controller 110 on a line 146, into an interrupt interface 118 of host controller 110. Upon receiving (204) an interrupt acknowledgement from host controller 110, embedded controller 120 disconnects (206) the pass-through connection between bus segments 102 and 104 and connects its memory interface 123 to bus segment 104. While the interrupt is being handled, embedded controller 120 accesses (208) memory unit 130. Since the interrupt prevents host 140 from performing its normal processing activities, there is no danger that host controller 110 will access memory unit 130 and interfere with the memory access of embedded controller 120. Upon completion of the memory access, embedded controller 120 reconnects (210) the pass-through connection between bus segments 102 and 104 and terminates (212) the interrupt, thus returning to pass-through operation state (200).

If (230), however, embedded controller 120 is in the permission-free state when accessing memory unit 130, controller 120 directly disconnects (206) the pass-through connection and accesses the memory. In some embodiments of the invention, embedded controller 120 is in the permission-free state at times at which it is clear that host 140 and any other master will not access memory unit 130, for example when host 140 is reset. Optionally, in embodiments in which embedded controller 120 is not expected to be in the permission-free state often, or at all, act 230 is not performed. After accessing memory unit 130 in the permission-free state, the pass-through connection is reconnected (210) and controller 120 returns to the pass-through state (200), without (240) performing acts required to terminate the interrupt procedure. Alternatively, in the permission-free state, controller 120 is continuously connected to memory unit 130 and the acts of disconnecting (206) and reconnecting (210) the pass-through connection are not required. When controller 120 leaves the permission-free state, the pass-through connection is connected.

In the exemplary embodiment of FIG. 1, the disconnection (206) of host controller 110 from memory 130 is performed using multiplexer 125. Alternatively, a TRI-STATE buffer scheme is used.

In some embodiments of the invention, the interrupt request of embedded controller 120 causes host controller 110 and host 140 to become idle by executing an interrupt process having no otherwise useful objective, possibly without performing any useful processing. Alternatively, the interrupt causes host 140 to perform maintenance tasks of computer 100 which do not involve accessing memory unit 130. Optionally, the interrupt request sends host 140 to check whether a register 128 controlled by embedded controller 120 is asserted and to terminate the interrupt only when register 128 is asserted. When embedded controller 120 completes the memory access, it asserts the value of the register 128. Alternatively, the interrupt causes host 140 to perform a task for a predetermined time, thereby allowing embedded controller 120 sufficient time to access memory unit 130, and then resume its normal operation.

In some embodiments of the invention, in which additional processors may attempt to access memory 130 via host controller 110 or through any other available interface, the interrupt process of host 140 also disables the additional processors in order to prevent them from accessing memory unit 130, while embedded controller 120 is accessing memory 130.

Alternatively or additionally, the interrupt request is provided in parallel to a plurality of processors which may attempt to access memory 130, or hardware handshake methods are used to notify one or more of the additional processors that they are to refrain from accessing memory 130.

In an exemplary embodiment of the invention, a master 154 connects to host controller 110 through a PCI bus 152. The interrupt process optionally instructs host controller 110 to prevent access to memory unit 130, by not granting access requests from master 154 or any other processor or non-processor master, until the interrupt is completed. Alternatively or additionally, the interrupt process disables master 154 until the interrupt process is completed, in order to prevent master 154 from interfering with the memory access of EC 120.

Optionally, host 140 is deactivated by interrupts of embedded controller 120 only infrequently, such as less than 0.5% of the time or even less than 0.1% of the time, so that the memory accessing of embedded controller 120 does not substantially disrupt the normal operation of host 140. In some embodiments of the invention, embedded controller 120 performs tasks which require only limited memory access, for example only up to 100, or even only up to 50 memory accesses per second, each memory access optionally requiring less than 15 microseconds or even less than 10 microseconds, or even less than 7 microseconds. Alternatively, embedded controller 120 intensively accesses memory unit 130, for example causing host 140 to be idle at least 5% or even at least 10% of the time. It has been determined by the inventors of the present invention that although such disruption of the operation of host 140 lowers its efficiency, the gain for requiring only a single memory unit 130 for both embedded controller 120 and host controller 110 outweighs this disadvantage under some circumstances.

While the interrupt request from embedded controller 120 is described hereinabove as passing through host controller 110, in other embodiments of the invention the interrupt request on line 146 is provided directly to host 140 without passing through host controller 110.

Referring in more detail to receiving (204) the interrupt acknowledgement; in some embodiments of the invention, the acknowledgement is provided on a dedicated hardware line 144 from host controller 110 to EC 120, or on a similar line connected directly from host 140, as part of a protocol for initiating and/or performing the interrupt. Alternatively, the acknowledgement is provided as an act of the initiated interrupt process, such as writing by the interrupt process into register 128 of embedded controller 120. In some embodiments of the invention, however, an acknowledgement is not required at all, and embedded controller 120 proceeds in accessing (208) memory unit 130, a predetermined time, for example 20 microseconds, after the interrupt request was sent.

The memory access (208) may include access to a single byte or other data block, or may include access to a plurality of data segments consecutively. The memory access (208) is optionally performed in a short session of less than 50 microseconds or even less than 20 microseconds.

Memory Access Control

In some embodiments of the invention, embedded controller 120 is configured to delay at least some memory accesses to memory unit 130 in order to meet constraints of one or more predetermined rules limiting the access to the memory unit and the disruption to the operation of host 140. Optionally, embedded controller 120 allows access to memory unit 130 only after at least a predetermined time from a previous access. Alternatively or additionally, embedded controller 120 accumulates a predetermined number of accesses to be performed together before sending an interrupt request to host controller 110. In some embodiments of the invention, in accordance with this alternative, if additional access reasons do not accumulate for a predetermined time, embedded controller 120 accesses memory unit 130 even if additional access reasons were not collected.

Three Processor Embodiment

Figure 3:
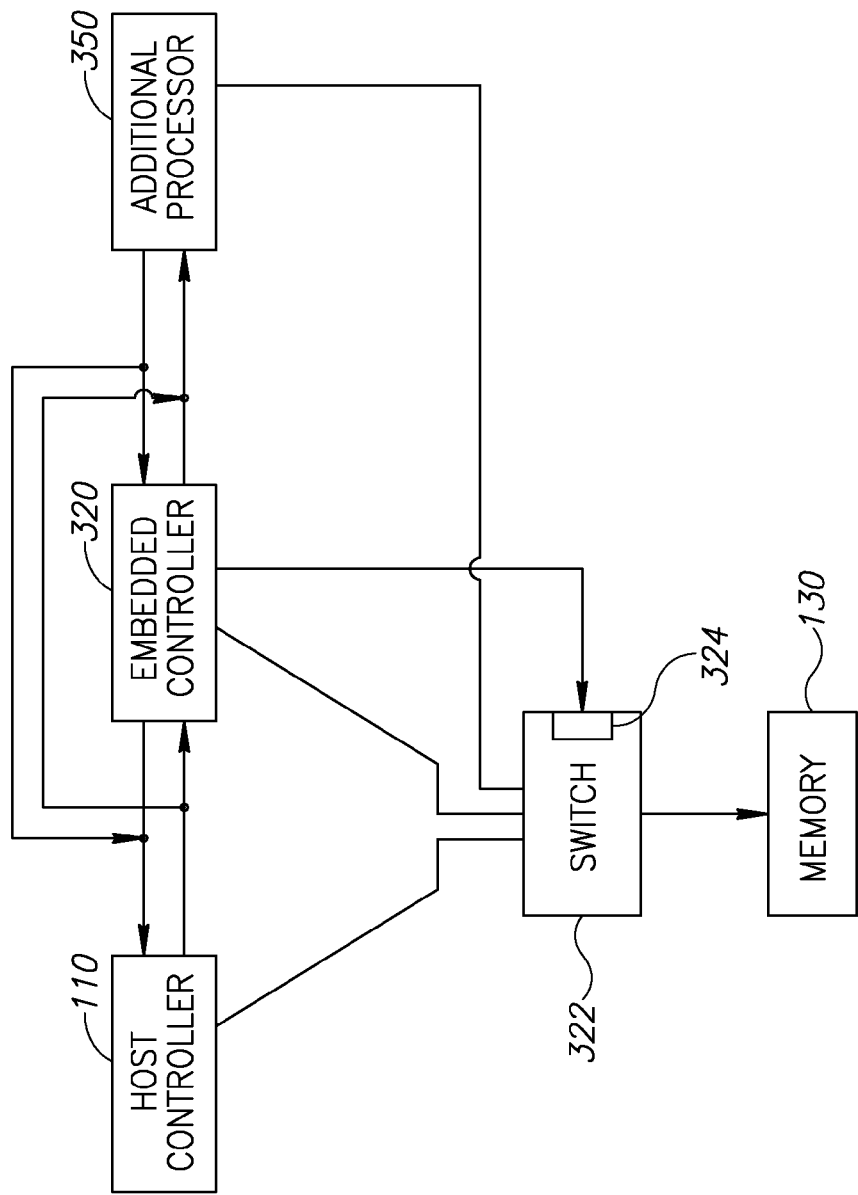
FIG. 3 is a schematic illustration of memory connections of a memory unit, in accordance with another exemplary embodiment of the present invention.

FIG. 3 is a schematic illustration of memory connections between memory unit 130 and other components, in accordance with another exemplary embodiment of the present invention. FIG. 3 is similar to FIG. 1, mutatis mutandis, but in FIG. 3 memory unit 130 is connected through a switch 322 to both host controller 110 and to an embedded controller 320. A switch select 324, controlled by embedded controller 320 determines whether host controller 110 or embedded controller 320 is actively connected to memory unit 130.

FIG. 3 also illustrates the sharing of memory unit 130 by three processors. In a steady state, host controller 110 is connected to memory unit 130. When embedded controller 320 needs to access memory unit 130, embedded controller 320 sends an interrupt request to host controller 110 and, upon receiving an acknowledgment, sets switch select 324 to operate with embedded controller 320 and performs its memory access. Similarly, when an additional processor 350 needs to access memory unit 130 it sends an interrupt request to host controller 110. Host controller 110 optionally only acknowledges a single interrupt at one time, such that additional processor 350 does not need to disable embedded controller 320 when accessing memory unit 130. When an acknowledgement is received from host controller 110, switch select 324 is set to operate with additional processor 350. Switch select 324 is optionally set by embedded controller 320 under instructions of additional processor 350. Alternatively, switch select 324 is directly controlled by additional processor 350, for example through a multiplexer or a mutually controlled line. After completing the data retrieval, additional processor 350 releases host controller 110.

Alternatives

Although the above description relates to an SPI bus, some of the above described methods and embodiments may be implemented with other serial and parallel bus protocols. In some embodiments of the invention, for example, the bus protocol and/or the units implementing the bus protocol do not have provisions for delegating control of the bus. Alternatively or additionally, the bus protocol does not have provisions for allowing the transmitter to determine collisions. In some embodiments of the invention, the bus protocol does not involve a handshake between the processor and memory unit.

While a single memory unit 130 is shown in FIG. 1, it will be appreciated that in other embodiments, the technology described hereinabove is used for sharing a plurality of parallel memory units between a plurality of processors.

While in the above description host controller 110 is continuously connected to memory unit 130 and the embedded controller 120 sends an interrupt request to the host controller to access the memory unit 130, in other embodiments of the invention different configurations are used. In one alternative configuration, host controller 110 sends an interrupt request to embedded controller 120 when accessing memory unit 130 is required.

Although the above description relates to sharing a memory unit, the above described methods may be used for sharing other resources.

Conclusion

It should be appreciated that the above described description of methods and apparatus are to be interpreted as including apparatus for carrying out the methods and methods of using the apparatus. It should be understood that, where appropriate, features and/or steps described with respect to one embodiment may be used with other embodiments and that not all embodiments of the invention have all of the features and/or steps shown in a particular figure or described with respect to a specific embodiment. Variations of embodiments described will occur to persons of the art.

It is noted that at least some of the above described embodiments include non-limiting details which were provided by way of example for illustration purposes and/or to describe the best mode contemplated by the inventors and therefore may include structure, acts or details of structures and acts that are not essential to the invention. Structure and acts described herein are replaceable by equivalents known in the art, which perform the same function, even if the structure or acts are different. Many specific implementation details may be used. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A system arrangement, comprising:
 a memory unit having a memory interface in accordance with a handshake-free protocol between the memory unit and an accessing master;
 a bus connected to the memory unit;
 a first master operative to access the memory unit through the bus and the memory interface and operative to perform interrupts, which prevent it from accessing the memory unit, following reception of an interrupt request through an interrupt interface, wherein the first master is operative to perform the interrupts which prevent it from performing its normal processing activities and thus prevent it from accessing the memory unit; and
 a second master operative to access the memory unit through the bus and the memory interface, wherein the second master is configured to transfer an interrupt request to the first master before accessing the memory unit and to access the memory unit while the first master is prevented from accessing the memory unit due to the interrupt request.

2. A system arrangement according to claim 1, wherein the memory interface comprises an interface in accordance with a protocol that does not support identification of collisions on the bus.

3. A system arrangement according to claim 1, wherein the memory interface comprises an interface in accordance with a protocol that does not support selection of a single processor to access the memory unit.

4. A system arrangement according to claim 1, wherein the memory interface comprises an interface in accordance with the Serial Peripheral Interface SPI protocol.

5. A system arrangement according to claim 1, wherein the first master comprises a host of a computer.

6. A system arrangement according to claim 5, wherein the first master is adapted to perform at least one of:
 (i) accessing the memory unit and
 (ii) receiving interrupt requests,
through a host controller.

7. A system arrangement according to claim 5, wherein the second master comprises an embedded controller of the computer.

8. A system arrangement according to claim 1, wherein the second master comprises a controller of a computer.

9. A system arrangement according to claim 8, wherein the second master comprises an embedded controller of a laptop computer.

10. A system arrangement according to claim 8, wherein the second master comprises a system controller of a computer.

11. A system arrangement according to claim 8, wherein the second master comprises a keyboard controller.

12. A system arrangement according to claim 1, wherein the first master has at least five times the maximal instruction throughput of the second master.

13. A system arrangement according to claim 1, wherein the second master is located along the bus connecting the first master to the memory unit.

14. A system arrangement according to claim 1, wherein the second master is configured to access the memory unit only after an acknowledgement is received from the first master in response to the interrupt request.

15. A system arrangement according to claim 1, wherein the second master is configured to access the memory unit a predetermined time after transferring the interrupt request, regardless of whether an acknowledgement is received.

16. A system arrangement according to claim 1, wherein the first master is configured to stop refraining from accessing the memory unit only in response to an indication from the second master.

17. A system arrangement according to claim 1, wherein the first master is configured to stop refraining from accessing the memory unit without receiving an indication from the second master.

18. A system arrangement according to claim 1, wherein the second master is configured to transfer an interrupt request to the first master before each session of accesses to the memory unit.

19. A system arrangement according to claim 1, wherein the first and second masters comprise processors.

20. A processor, comprising:
- a memory interface operative to control a memory unit via a handshake-free protocol;
- an interrupt interface for transfer of interrupt requests to processors; and
- a processing unit operative to perform processing tasks and to read data from a memory unit or store data to a memory unit through the memory interface, the processing unit being configured to transfer an interrupt request through the interrupt interface and receive an acknowledgement of the interrupt request before accessing a memory unit through the memory interface and to access the memory unit while a first master is prevented from accessing the memory unit due to the interrupt request, wherein the first master is operative to perform interrupts which prevent it from performing its normal processing activities and thus prevent it from accessing the memory unit.

21. A processor according to claim 20, wherein the processing unit is operative to receive the acknowledgement of the interrupt request via the interrupt interface.

22. A processor according to claim 20, wherein the processing unit is operative to receive the acknowledgement of the interrupt request via a register that is independent of the interrupt interface.

23. A processor according to claim 20, wherein the processing unit is operative to read code segments from the memory unit.

24. A processor according to claim 23, comprising an internal memory configured to store less than an entire code of an application to be performed by the processing unit, wherein the internal memory is configured to swap code segments from the memory unit through the memory interface.

25. A processor according to claim 20, wherein the processing unit is operative to operate in both:
   (i) a first state in which it does not transfer an interrupt request before accessing a memory through the memory interface and
   (ii) a second state in which the processing unit only accesses the memory unit after transferring an interrupt request and receiving an acknowledgement of the interrupt.

26. A processor according to claim 25, wherein the processing unit is operative to operate in the first state when there is no danger that another master will access the memory.

27. A method of accessing a memory unit, comprising:
- providing one or more first masters connected to a memory unit;
- determining by a second master that an access to the memory unit is required;
- sending an interrupt request, intended to prevent the one or more first masters from accessing the memory unit, from a second master to the one or more first masters, responsive to the determination that access to the memory unit is required;
- receiving an acknowledgement from the one or more first masters responsive to the interrupt request; and
- accessing the memory unit while the one or more first masters are handling the interrupt request,
- wherein the one or more first masters are operative to perform interrupts which prevent them from performing their normal processing activities and thus prevent them from accessing the memory unit.

28. A method according to claim 27, comprising releasing the one or more first masters from the interrupt request after completing the memory access.

29. A method according to claim 27, wherein accessing the memory unit comprises a read-only access.

30. A method according to claim 27, wherein accessing the memory unit comprises a write access.

31. A method according to claim 27, wherein accessing the memory unit comprises accessing through an interface governed by a single master protocol.

* * * * *